United States Patent Office

2,882,278
Patented Apr. 14, 1959

2,882,278

ORGANOPHOSPHORUS DERIVATIVES OF DIHYDROTHIOPHENE 1,1-DIOXIDE

Richard L. McConnell and Newton H. Shearer, Jr., Kingsport, Tenn., assignors to Eastman Kodak Company, Rochester, N.Y., a corporation of New Jersey No Drawing. Application August 9, 1956
Serial No. 603,168

11 Claims. (Cl. 260—332.1)

This invention relates to new compositions of matter and to their preparation. In one of its aspects, it relates to new organophosphorus compounds derived from 2,5- and 2,3-dihydrothiophene 1,1-dioxide.

It is known that various phosphorus-containing compounds are useful as pesticides and insecticides. The compounds of this invention have been found to be exceptionally useful as insecticides and pesticides. Accordingly, among the objects of this invention is to provide new and useful pesticidal compositions, to provide new and improved organophosphorus compounds, and to provide a new and useful method of producing the compounds of the invention. These and other objects will be apparent from the description and claims which follow.

The new organophosphorus compounds of the invention are characterized by the general formula:

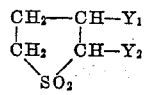

wherein one of $Y_1$ and $Y_2$ is hydrogen, both being selected from the group consisting of —H and the radicals:

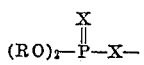

and

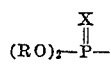

wherein R is selected from the group consisting of lower alkyl groups and cycloalkyl groups, such as cyclohexyl, and X is selected from the group consisting of oxygen and sulfur.

The preferred method employed to produce these compounds consists of reacting a dialkyl phosphite or a dialkyl phosphorothiolothionate with 2,5- and 2,3-dihydrothiophene 1,1-dioxide. The reaction proceeds without the aid of a catalyst, but we have found that a preferred method, producing better results, is to utilize a basic catalyst such as a tertiary amine, an alkali metal alkoxide, an alkali metal salt of the dialkyl phosphites or an alkali metal amide, in effectuating the reaction. Tertiary amines, such as trimethylamine, triethylamine and tributylamine are particularly useful in catalyzing the reaction of the phosphorothiolothionates; alkali metal alkoxides, such as sodium and potassium ethoxide, alkali metal salts of the dialkyl phosphites such as sodium dibutyl phosphite, sodium diethyl phosphite and alkali metal amides such as sodium amide, were found to be particularly useful as catalysts for the phosphite reactions. The temperature range for the reaction, depending on the specific reactants employed, is 0–200° C.; however, the preferred range is 25° to 100° C. Solvents are not essential but they may be used if desired. Suitable solvents include ethers, such as diethyl ether, aliphatic hydrocarbons, such as hexane, pentane and heptane, the aliphatic alcohols, chlorinated hydrocarbons and aromatic hydrocarbons, such as benzene and toluene. Excess dialkyl phosphite may also be used as the solvent. The preferred reaction time will vary from 1 to about 8 hours. After the reaction is completed, the excess solvent is removed under reduced pressure.

The following equations are illustrative of the reactions involved in the preparation of the subject compounds:

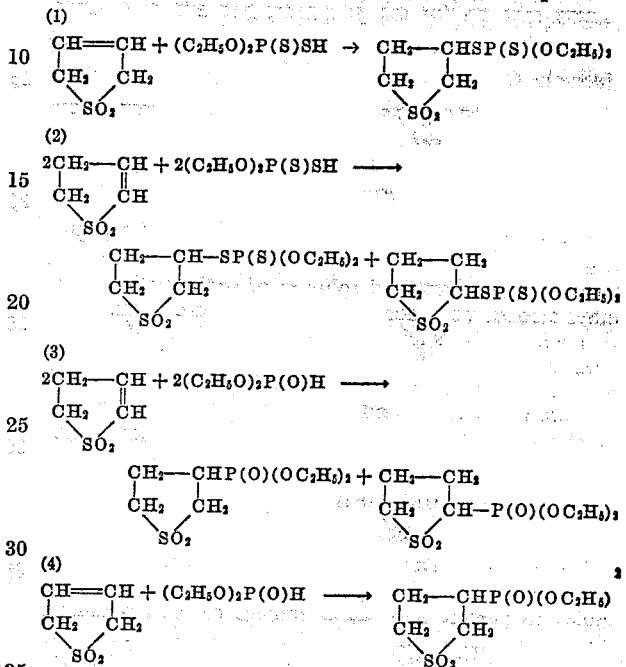

It will be noted that the 2,3-dihydrothiophene 1,1-dioxide reacts so as to produce a mixture of two isomers. The following examples will further illustrate and explain the invention:

EXAMPLES

1. *O,O-diethyl S-(tetrahydro-1,1-dioxo-3-thienyl)phosphorothiolothionate*

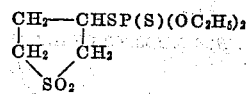

A mixture of O,O-diethyl phosphorothiolothionate (0.1 mole) and 2,5-dihydrothiophene 1,1-dioxide (0.1 mole) was placed in a reaction flask and stirred while 3 ml. of triethylamine was added. The temperature of the reaction mixture rose rapidly to 70° C. When the temperature began to drop, it was heated on a steam bath with stirring for 2 hours. After the reaction mixture had cooled to 25° C., it was placed under reduced pressure (1 mm.) to remove the catalyst and any volatile impurities present. The product is a yellow oil which is pure enough for use without further treatment.

2. *O,O-diethyl S-(tetrahydro-1,1-dioxo-2-thienyl)phosphorothiolothionate and O,O-diethyl S-(tetrahydro-1,1-dioxo-3-thienyl)phosphorothiolothionate*

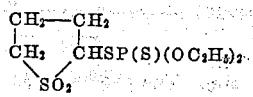

and

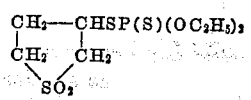

O,O-diethyl phosphorothiolothionate (0.1 mole) and 2,3-dihydrothiophene 1,1-dioxide (0.1 mole) were reacted according to the procedure of Example 1, except that tributylamine was used as the catalyst instead of triethylamine. The product was a yellow oil and contained the two isomers shown above.

3. *O,O-diisobutyl S-(tetrahydro-1,1-dioxo-3-thienyl)-phosphorothiolothionate*

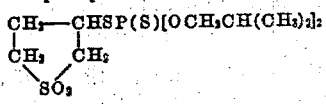

This product was prepared from O,O-diisobutyl phosphorothiolothionate (0.1 mole) and 2,5-dihydrothiophene 1,1-dioxide (0.1 mole) according to the procedure of Example 1.

4. *Diethyl (tetrahydro-1,1-dioxo-3-thienyl)phosphonate*

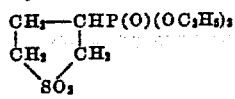

Diethyl hydrogen phosphite (0.1 mole) and 2,3-dihydrothiophene 1,1-dioxide (0.1 mole) were mixed and stirred while a saturated solution of sodium ethoxide in ethyl alcohol was added. The temperature of the reaction mixture gradually rose to about 40° C. When the temperature had started to drop, the reaction mixture was heated on steam bath with stirring for 2 hours. The product was a viscous oil.

5. *Dibutyl (tetrahydro-1,1-dioxo-3-thienyl) phosphonate*

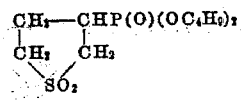

Dibutyl hydrogen phosphite (0.12 mole) was placed in a reaction flask and reacted with metallic sodium (0.01 mole) to prepare a catalytic amount of sodium dibutyl phosphite. 2,5-dihydrothiophene 1,1-dioxide (0.1 mole) was added with stirring and then the reaction mixture was heated on a steam bath for 4 hours. The product was a transparent, amber, viscous oil.

6. *Dicyclohexyl (tetrahydro-1,1-dioxo-3-thienyl) phosphonate*

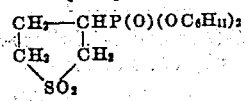

This compound was prepared by the reaction of dicyclohexyl hydrogen phosphite (0.13 mole), 2,3-dihydrothiophene 1,1-dioxide (0.1 mole), and sodium amide according to the procedure of Example 4.

7. *Dipropyl (tetrahydro-1,1-dioxo-2-thienyl)phosphonate and dispropyl (tetrahydro-1,1-dioxo-3-thienyl)phosphonate*

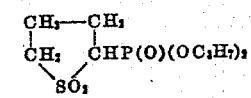

and

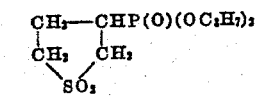

Dipropyl hydrogen phosphite (0.2 mole), 2,3-dihydrothiophene 1,1-dioxide (0.2 mole), and di-tert-butyl peroxide were placed in a rocking autoclave and heated at 130° C. for 8 hours. The product was a tan viscous oil.

The following data indicates the use of certain embodiments of the invention as insecticides and is illustrative of their utility in this regard.

Tests against mites and mite eggs were carried out in the following manner: Acetone solutions containing 5% of the candidate compounds were prepared and diluted with water to give solutions containing 1.0%, 0.5%, and 0.1% of the candidate compounds for testing. Two heavily infested bean leaves containing both eggs and adult two-spotted mites (*T. bimaculatus*) were carefully dipped in the above solutions and dried in a gentle air stream. The leaves were then placed on damp paper toweling in Petri dishes and observed after 24 hours for mortality among the adult mites. The leaves are observed again after 7 days to determine the number of eggs killed by the treatment.

It should be noted that tests using acetone-water solutions (containing none of the toxicant) kill neither mites nor mite eggs. These are the blank runs referred to in the following table.

| Toxicant | Percent Concentration | Percent Kill Mites |
|---|---|---|
| 1. Blank | 0 | 0 |
| 2. O,O-Diethyl S-(tetrahydro-1,1-dioxo-3-thienyl) phosphorothiolothionate (Example 1) | 1.0 | 100 |
|  | 0.5 | 100 |
|  | 0.1 | 9 |
| 3. Diethyl (tetrahydro-1,1-dioxo-3-thienyl) phosphonate (Example 4) | 1.0 | 100 |
|  | 0.5 | 96 |
|  | 0.1 | 2 |

| Toxicant | Percent Concentration | Percent Kill Mite Eggs |
|---|---|---|
| 1. Blank | 0 | 0 |
| 2. O,O-Diethyl S-(tetrahydro-1,1-dioxo-3-thienyl) phosphorothiolothionate (Example 1) | 1.0 | 100 |
|  | 0.5 | 98 |
|  | 0.1 | 8 |
| 3. Diethyl (tetrahydro-1,1-dioxo-3-thienyl) phosphonate (Example 4) | 1.0 | 100 |
|  | 0.5 | 100 |
|  | 0.1 | 20 |

These compounds were not phytotoxic to beans, cucumbers, radishes, lettuce, tomatoes, nor rye grass when sprayed on these plants at 0.5% concentrations. Therefore, the compounds of this invention can be used as insecticides in the form of sprays without damage to the plant which was infested with insects.

Although the invention has been described in considerable detail with paraticular reference to certain preferred embodiments thereof, variations and modifications can be effected within the spirit and scope of the invention as described hereinabove, and as defined in the appended claims.

We claim:

1. The organophosphorus compounds corresponding to the formula

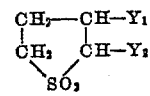

wherein one of $Y_1$ and $Y_2$ is hydrozen, both being selected from the group consisting of hydrogen and the radicals

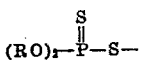

and

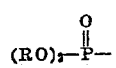

wherein R is selected from the group consisting of lower alkyl and cyclohexyl groups.

2. As a composition of matter, the organophosphorus compounds corresponding to the formula:

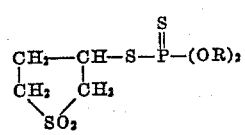

wherein R is a lower alkyl group.

3. As a composition of matter, the organophosphorus compound corresponding to the formula:

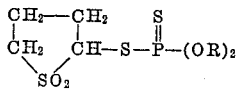

wherein R is a lower alkyl group.

4. As a composition of matter, the organophosphorus compounds corresponding to the formula:

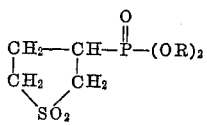

wherein R is a lower alkyl group.

5. As a composition of matter, the organophosphorus compounds corresponding to the formula:

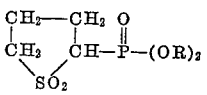

wherein R is a lower alkyl group.

6. O,O-diethyl S-(tetrahydro-1,1-dioxo-3-thienyl) phosphorothiolothionate.

7. O,O-diethyl S-(tetrahydro-1,1-dioxo-2-thienyl) phosphorothiolothionate.

8. O,O-diisobutyl S-(tetrahydro-1,1-dioxo-3-thienyl) phosphorothiolothionate.

9. Dicyclohexyl (tetrahydro-1,1-dioxo-3-thienyl) phosphonate.

10. Diethyl (tetrahydro-1,1-dioxo-3-thienyl) phosphonate.

11. The process for producing the compounds of claim 1 which comprises reacting an organophosphorus compound selected from the group consisting of dialkyl phosphites and dialkyl phosphorothiolothionates with dihydrothiophene 1,1-dioxide, the reactants being in a substantially equimolar ratio, at a temperature within the range of 0–200° C.

References Cited in the file of this patent
UNITED STATES PATENTS
2,749,340    Feichtinger _____ June 5, 1956

OTHER REFERENCES
Kosolapoff: J.A.C.S. 69: 2248 (1947).